United States Patent [19]

Constant

[11] 4,067,009
[45] Jan. 3, 1978

[54] BEAM FOCUSED SYNTHETIC APERTURE

[76] Inventor: James Nickolas Constant, 1603 Danbury Drive, Claremont, Calif. 91711

[21] Appl. No.: 601,392

[22] Filed: Aug. 1, 1975

[51] Int. Cl.² ............................................. G01S 9/02
[52] U.S. Cl. .............................................. 343/5 CM
[58] Field of Search ................................... 343/5 CM

[56] References Cited

U.S. PATENT DOCUMENTS

| | | | |
|---|---|---|---|
| 3,606,519 | 9/1971 | Kurtz | 350/3.5 |
| 3,892,468 | 7/1975 | Duguay | 350/169 X |
| 3,895,381 | 7/1975 | Kock | 343/5 CM |

*Primary Examiner*—T.H. Tubbesing
*Attorney, Agent, or Firm*—Harris, Kern, Wallen & Tinsley

[57] ABSTRACT

A beam focused synthetic aperture having a lens or antenna for receiving radiation in a receiving beam from an object of interest, a detector for receiving radiation from the lens or antenna, and an output and display circuit for using and viewing the detector output, with delay means internal or external to the lens or antenna and between the object and detector and for producing the matched spatial filtering of signals from objects crossing the receiving beam, and with the detector producing a pulse for each object crossing the receiving beam.

30 Claims, 9 Drawing Figures

BEAM FOCUSED SYNTHETIC APERTURE

BACKGROUND OF THE INVENTION

Since the development of synthetic aperture, attempts have been made to reduce the size, weight, power consumption, and cost of these systems. Basically, a target crossing a radar beam produces a chirp signal at the output of a detector. The chirp signal is then processed electronically in a matched filter in real time or is recorded and then reproduced at a later time in an optical matched filter. The real time operation of the electronic processor is obtained at the expense of large size, weight, and power consumption of the processor while the small size, weight, and power consumption of the optical processor is obtained at the expense of an annoying delay of obtaining images. Examples of conventional synthetic aperture can be found in the paper by L. Cutrona et al., "On the Application of Coherent Optical Processing Techniques to Synthetic Aperture" appearing in the August, 1966 issue of Proc. IEEE, and in the paper by W. Brown and L. Porcello, "An Introduction to Synthetic Aperture Radar" appearing in the September, 1969 issue of IEEE Spectrum. While these systems first record detected signals and then reproduce images in a time consuming two step process, my U.S. Pat. Nos. 3,691,557 System for Identifying Objects Using an Encoding Array for each Object, 3,790,939 Real Time Synthetic Radar, 3,798,644 Vector Velocity System, and 3,858,203 Synthetic Radiometer and System for Identifying Objects are examples of systems which process their signals electronically in real time.

While all the known apparatus and methods of the prior art have the ability to form synthetic apertures, they have significant inherent disadvantages. For example, systems using optical processing while significantly reducing the size, weight, and power consumption of processors and increasing the data capacity for two dimensional imaging do so at the expense of a two step recording and then reproducing cycle which often is time consuming in many applications. On the other hand, systems using electronic processing while operating in real time do so at the expense of having large size, weight, and power consumption of their processors and having a reduced data capacity. Because of these disadvantages, the conventional synthetic aperture has found limited use, mainly in military surveillance, reconnaisance, and ground mapping applications and has found no commercial application whatsoever. It is desired to provide a synthetic aperture apparatus and method that overcomes these disadvantages so that synthetic aperture will have a widespread and commercial use. More specifically, it is desirable to provide a synthetic aperture apparatus and method that has a real time operation yet has a small size, weight, power consumption, and cost, and high capacity, i.e., combining the best features of prior art systems while eliminating their disadvantages.

From the foregoing it will be appreciated that the invention is concerned with producing a synthetic aperture for objects crossing the receiving beam. The generation of a synthetic aperture in the prior art and in the system of the invention is based on the matched filtering of signals received from objects crossing a receiving beam. However, whereas the prior art first detects signals and then performs matched filtering, the invention first performs matched filtering and then detects signals, such matched filtering being provided by the delay means of the invention acting as a predetection matched filter of signals from objects. Importantly, the invention provides capabilities over the prior art in the measurement of broadband targets.

Matched filtering in the prior art and in the system of the invention requires the spectral coherency between transmissions and receptions of signals. However, the system of the invention also enables the measurement of broadband targets by cosine modulating signals from targets, such cosine modulation being provided by the delay means of the invention acting as a beamsplitter-recombiner of signals from objects.

Therefore, it is an object of this invention to provide apparatus and method for a synthetic aperture that operates in real time.

It is also an object of this invention to provide apparatus and method for a synthetic aperture having small size, weight, power consumption, and high capacity.

It is another object of this invention to provide apparatus and method for a synthetic aperture which detects already synchronized or focused signals and thereby eliminates the further post-detection processing of signals indicated by the prior art.

It is another object of this invention to provide apparatus and method for a focused beam synthetic aperture which operates in either one of the microwave or optical portions of the electromagnetic spectrum.

It is a further object of this invention to provide apparatus and method for a focused beam synthetic aperture which is capable of readily changing its focus.

It is yet another object of this invention to provide apparatus and method which is capable of operating passively using coherent or noncoherent objects as sources.

SUMMARY OF THE INVENTION

In accordance with a principle of this invention an apparatus for a synthetic aperture is provided. The apparatus comprises a detector for receiving reflections or emissions from targets, a lens or antenna for forming a receiving beam, and a delay means for synchronizing or focusing signals from targets crossing the beam. A target in transit of the beam generates a spatially modulated signal wavefront unsynchronized in time and which is converted to a spatially modulated signal synchronized in time by the delay means which acts as a spatial matched filter. The synchronized wave from the delay means falls onto the detector whose output is the inverse Fourier transform of the synchronized signal convolution spectrum and represents an impulse. In accordance with another principle of this invention, the delay means may include a beamsplitter for cosine modulating signals.

In accordance with another principle of this invention, the apparatus for a synthetic aperture may include a transmitter for illuminating targets.

In accordance with another principle of this invention, the apparatus for a synthetic aperture may include a local oscillator for heterodyning received signals.

In accordance with another principle of this invention, the apparatus for a synthetic aperture may include a controller for controlling the cosine modulation synchronization or focusing of its delay means.

In accordance with a further principle of this invention the apparatus for a synthetic aperture may include a coded target forming a label attached to an object for identifying the object with a plurality of labels with a label for each object being identified.

In accordance with another principle of this invention, a method for a synthetic aperture is provided. The method comprises the steps of:
  generating an electromagnetic receiving beam;
  detecting signals from targets crossing said receiving beam; and
  synchronizing or focusing said signals in a matched spatial filter prior to their being detected.

In accordance with another principle of this invention the method also includes the step of cosine modulating signals in a delay device prior to their being detected.

In accordance with another principle of this invention, the method for a synthetic aperture also includes the steps of:
  generating an electromagnetic transmitting beam; and
  directing said transmitting beam to the direction of targets.

In accordance with a further principle of this invention, the method for a synthetic aperture also includes the steps of:
  generating a local frequency for heterodyning signals being detected.

In accordance with yet another principle of this invention, the method for a synthetic aperture also includes the step of:
  generating control signals for controlling the cosine modulation synchronization or focusing range of signals in said matched filter.

In accordance with yet another principle of this invention, the method for a synthetic aperture also includes the steps of coding targets crossing said receiver beam, providing labels in the form of coded targets, attaching labels to objects for identifying objects with a code, and providing a plurality of labels with a label for each object.

It will be appreciated from the foregoing description that the invention provides apparatus and method for implementing a synthetic aperture. The apparatus comprises a detector which detects signals from targets through a lens or antenna forming a receiving beam which connects the detector and target in a space link and through a delay means which acts as a spatial matched filter and synchronizes or focuses target signals prior to their detection by the detector. The terms synchronize and focus are used herein to denote the action of the delay means as a matched filter. The method is equally uncomplicated and comprises the steps of generating an electromagnetic receiving beam, detecting signals from targets crossing said receiving beam, and synchronizing or focusing signals from targets prior to their being detected. Whether looked upon as a matched filter or modulator the delay means varies either or both its path length or its index of refraction to vary either or both the amplitude or phase of a passing electromagnetic waveform.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings wherein.

DESCRIPTION OF THE PREFERRED EMBODIMENTS

Prior to describing the invention, a brief description of the theory of the invention is hereinafter set forth. It is well known that an electromagnetic wave can be spatially modulated both in its amplitude and phase by passing the wave through certain materials which have been judiciously chosen, or passing the wave through an interferometer, or passing the wave through a modulator, or passing the wave through any combination of the foregoing. For example, a collimated electromagnetic beam can be spatially modulated by passing the beam through a modulator which can be controlled electrically, magnetically, acoustically, mechanically, or yet even by another beam.

It will be appreciated from the foregoing theory that the electromagnetic beam of a synthetic aperture can be spatially modulated by passing the beam through a material, interferometer, modulator, or combination of same, and which hereinafter will be referred to as a delay means. Because the delay means spatially modulates the passing beam in both amplitude and/or phase it can be used to synchronize or focus a wavefront. That is, by applying an unsynchronized time-varying wavefront to its input, the output from the delay means is spatially synchronized in time, i.e., a curved wavefront falling obliquely onto the delay means emerges as a plane wave. Hence, it will be recognized by those in the art, that the delay means serves the purpose of a spatial matched filter, correlator, convolver, or impulse generator as desired. Moreover, if the matched filter characteristic is externally controlled it can be made to match any type of spatial signal appearing at its input.

The basic problem of the invention is for specifying a delay means or spatial filter in the path of reflected signals from targets crossing an electromagnetic or acoustic receiving beam. For example, pulse compression with gratings is well known and is described in the brief article by W. Kock appearing at page 1395 of the September, 1970 issue of IEEE Proceedings (Lett). Thus, it is possible to chirp impulsive broadband signals and to dechirp chirped signals into impulsive broadband signals as it is equally possible to stretch and compress (in time) monochromatic signals. Moreover, it is possible to obtain the cosine modulation of signals as explained more fully in my U.S. Pat. No. 3,858,203. Thus, the delay means in accordance with the system of the present invention performs the function of a spatial matched filter of spatially modulated signals (monochromatic narrowband or broadband) received by a receiver and, in some applications, may provide the function of cosine modulation. The latter function is useful in applications which require the broadbanding of signals (through their modulation) and improvement of their time resolution and in applications which require the processing of broadband signals.

Figure 1:
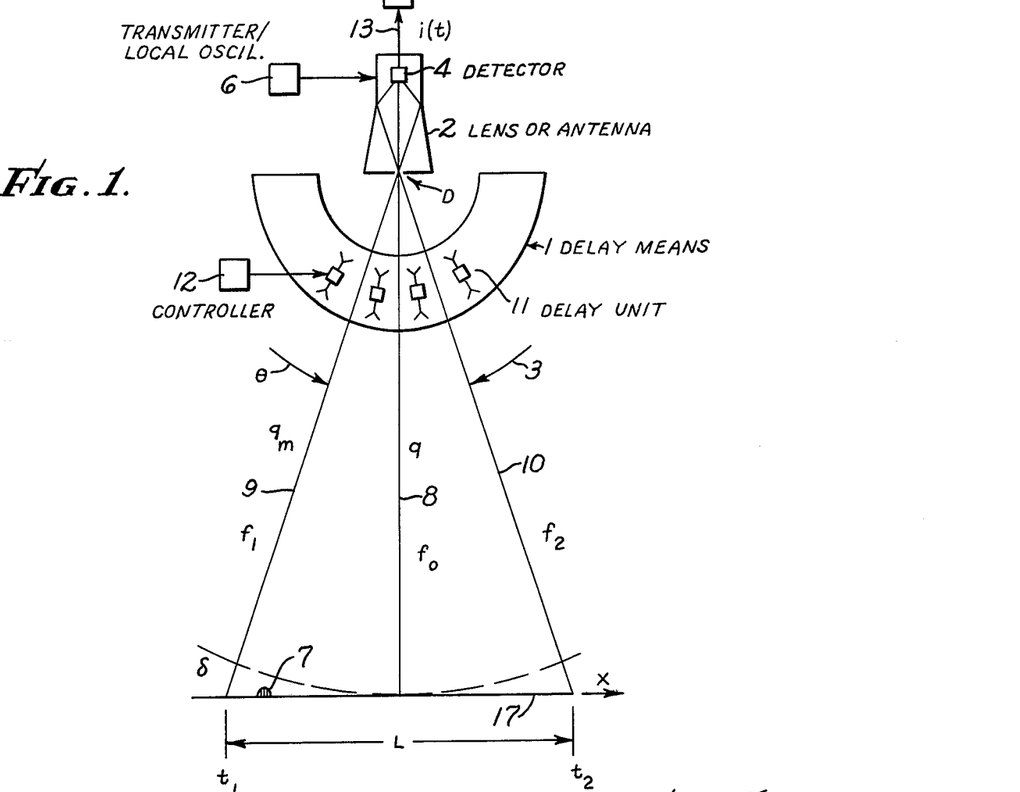
FIG. 1 is a schematic diagram which illustrates a microwave embodiment of the apparatus of the invention.
Figure 2:
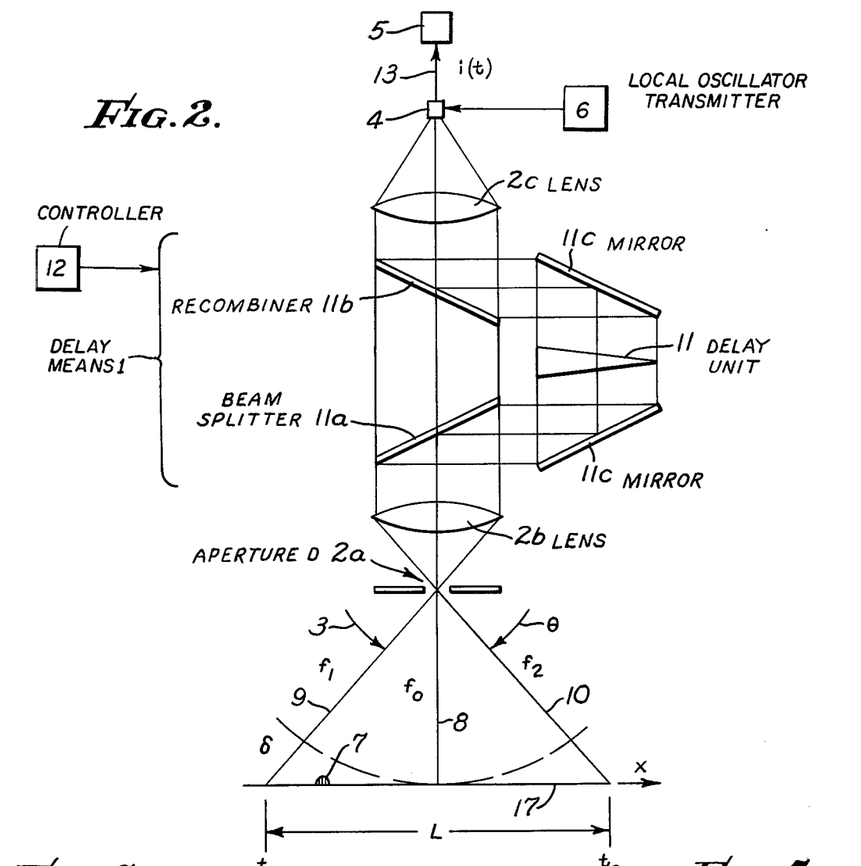
FIG. 2 is a schematic diagram which illustrates an optical embodiment of the apparatus of the invention.

Turning now to the preferred embodiments of the apparatus of the invention; FIG. 1 illustrates: a microwave delay means 1, a microwave lens or antenna 2 forming microwave beam 3, a detector 4, an output and display 5, and for some applications, a transmitting and/or local oscillator 6, controller 12, and target 7 in the form of a label; FIG. 2 illustrates optical delay means 1, an optical lens or antenna comprising an aperture 2a and collimating lens 2b forming optical beam 3 and a decollimating lens 2c, a detector 4, an output and display 5, and for some applications, a transmitting and/or local oscillator 6, controller 12, and target 7 in the form of a label.

Except for the lack of a post-detection matched filter, the items 2 through 6 collectively constitute a conventional synthetic aperture which may be any one of a number of well known types subject only to the constraints imposed in its use in conjunction with delay means 1 in accordance with the teachings of the present invention. In the present invention, the role of the post detection matched filter (electronic or optical) of a conventional synthetic aperture is carried out by delay means 1 which acts as a predetection matched filter.

Elements 2 through 6 are found in conventional synthetic apertures and may be any of the well known units. The lens or antenna 2 may be an antenna type structure used at microwave and millimeter frequencies or a lens device used at infra-red and optical frequencies. The lens or antenna 2 has a beamwidth 3 and may be scanned by conventional techniques if desired. The delay means 1 is a known element per se, but is new in synthetic apertures for use as a spatial matched filter. Examples of electromicrowave spatial modulators for a microwave beam have been suggested in the news item by D. Kaye, "Multiple-beam antenna could boost communication satellite capacity" appearing in the July 5, 1974 issue of Electronic design and in the news item by S. Bearse, "Planar array looks through lens to provide hemi-spherical coverage" appearing in the July, 1975 issue of Microwaves. Other microwave spatial modulators comprise bulk or surface acoustic wave devices and materials arrayed in a radome to provide time delays to waves passing through the radome. Spatial modulators for optical waves are more numerous and are easier to implement over their microwave counterparts — by virtue of their small size. These include electro-optical, magneto-optical, optical waveguide devices, electrically depleted band gaps, electrically depleted free carriers, semiconductor free-carrier modulators, and many others. In particular, a transmitting or reflecting grating as suggested in the reference by W. Kock may be used to implement the desired spatial matched filtering.

Turning now to description of the operation of the invention illustrated in FIGS. 1 and 2, a target 7 moves in the direction x relative to a lens or antenna 2. The shortest slant range between the target 7 and lens or antenna 2 is $q$, and $q_m$ is the maximum slant range viewed by the beamwidth 3. It is a well known fact of conventional synthetic aperture that the doppler shift $f_d$ of the signal seen by the detector 4 is proportional to the distance between target 7 and the line of symmetry 8. This fact is the basis upon which it becomes possible to generate a synthetic aperture. Thus, in conventional synthetic aperture, i.e., without delay means 1, the signals arriving at the detector 4 due to the passing of target 7 through beam 3 in the direction x are spatially asynchronous, i.e., arriving at different times. These signals are subsequently processed, after being detected, over the time period T of their occurance which corresponds to the time it takes target 7 to cross beam 3. In the system of the present invention, the signals arriving at the detector 4 arrive synchronously, i.e., at the same time, their synchronization or focusing having been accomplished by their passing through delay means 1. Thus, while in a conventional synthetic aperture the signals must be processed after they have been detected in detector 4, there is no further need for such post detection processing of signals in the present invention. In either case, a synthetic aperture is generated, in the former case using coherent signals and the coherent post detection integration or pulse compression of optical or electrical signals while in the latter case the signals may or may not be coherent and their processing is made prior to their detection in detector 4.

In a non-cooperative system target 7 is any one of a natural or man-made object of interest while in cooperative system target 7 may assume the role of a label attached, built into, etched, or imprinted upon an object of interest such as a vehicle, container, box, carton, postal mail, stock certificate, etc., which itself moves in the direction x. Target 7 reflects or radiates coherently or non-coherently as a monochromatic narrowband or broadband source. In some applications target 7 may reflect a harmonic frequency of its illumination. In applications for identifying objects using labels target 7 plays the role of a coded label which may take any one of a number of well known forms. Labels are attached to objects being identified and may utilize any one of a number of well known codes. For example, microwave labels may be formed as arrays of half-wavelength metallic dipoles or slots having half-wavelength spacings and placed on the surface of a vehicle. Each dipole or slot in the label may reflect a fundamental or harmonic frequency of its illumination, for example the harmonic reflector suggested in the paper by J. Shefer and R. Klensch, "Harmonic radar helps autos avoid collisions" appearing in the May, 1973 issue of IEEE Spectrum. The dipoles or slots are coded, for example as a binary code, with a unique code or label for each object which is to be identified. On the other hand optical labels may take any one of a number of well known forms, for example bar codes suggested in the paper by G. Whittaker and W. Sexton, "Printers and Readers Handshake for Effective Bar Code Systems" appearing in the September, 1974 issue of Computer Design and in the paper by E. Yasaki, "Bar Codes for Data Entry" appearing in the May, 1975 issue of Datamation. In general, target 7 in the form of a label has a plurality of code elements disposed at selected locations in the label with the presence or absence of code elements at code element locations comprising a code for each object, and with a code element comprising a zone having a radiation characteristic different from that of the object background to which it is attached. Bar codes suitable for use such as Pulse Width Modulated (PWM), F2F, Codabar ™, Universal Product Code (UPC), Two-out-of-Five, Interleaved Two-out-of-Five, and Code 39 have been described in the report "Bar Codes: A General Background and Reference List" June 11, 1975 Report No. 601322, Interface Mechanisms, Inc., Washington 98043. From the foregoing the making and coding of target 7 as a label will be obvious to those skilled in the art. Shown in FIG. 1, delay means 1 may comprise a dielectrically loaded passive lens or radome studded with delay units or phase shifters 11 in the form of ferrites, bulk or surface wave delay devices which are either fixed or whose delay frequency or phase may be changed by a controller 12. When a spatial wave, to or from target 7, passes through delay means 1, the wave is delayed in its path at each location of delay means 1. The wave may also be split at each location of delay means 1 into two paths one having no additional delay and the other having an incremental delay above that already provided by the delay unit 11. It will be appreciated by those skilled in the art that it is a relatively easy task to vary the incrementally delayed and incrementally undelayed paths of the wave at each location of delay means 1 in proportions as desired in a given application. Thus, it is possible to incrementally delay the entire wave at each location leaving no part passing delay means 1 incrementally undelayed as it is equally possible of leaving the wave incrementally undelayed. Moreover, it is possible to change the delay of delay units 11 as a function of the angle of signal arrival, i.e., of the target 7 direction as seen by delay means 1. In the following the terms delay and incremental (differential) delay will be used to denote delays provided by delay units 11 and the wavesplitting delay of a beamsplitter-recombiner in delay means 1 respectively.

It will be appreciated by those skilled in the art that while delay means 1 is shown in FIG. 1 by way of example as a radome external to lens or antenna 2 it may equally well be implemented as a device internal to lens or antenna 2, this all being possible in accordance with the state of the art and the frequency at which delay means 1 operates. Thus, the present state of the art for delay means 1 more readily permits internal implementations at optical frequencies but is more likely to confine to external implementations at microwave frequencies. Also, it will be further appreciated by those in the art that while delay means 1 is shown in FIG. 1 by way of example as a radome including delay units 11, it may be implemented equally well using lightweight printed circuit phase shifters as suggested in the reference by V. Bearse or in any one of a number of ways equally providing the results of delay units 11. For example, delay means 1 may comprise any one of a number of materials, interferometers, phase shifters, delay lines, modulators for achieving the desired results, i.e., for implementing delay means 1 as a spatial matched filter and wave splitter. It will be further appreciated by those in the art that it is possible to vary one of the spatial amplitude frequency and phase of an electromagnetic wave passing through delay means 1.

Shown in FIG. 2, delay means 1 is shown taking the form of a beamsplitter-recombiner in which a wave is divided in two paths at the beamsplitter 11a, one path going directly to a recombiner 11b and the other going to mirrors 11c and then to the recombiner 11b, with the two paths recombined at 11b. A delay unit 11 is shown between mirrors 11c for providing the signal delay which the beamsplitter-recombiner provides the incremental delay as needed. While the delay unit is shown internal it may be preceding or following the beamsplitter-recombiner equally well. It will be appreciated that the delay $t_2 - t$ provided by the delay unit 11 and the differential delay $\tau$ provided by the beamsplitter-recombiner may be varied by a controller 12 as used in FIG. 1. When a spatial wave, to or from target 7, passes delay means 1, the wave is delayed in its path at each location of delay means 1. The wave may also be split into two paths one having no additional delay above that already provided by the delay unit 11. It will be appreciated by those skilled in the art that it is a relatively easy task to vary the delayed and incrementally delayed paths of the wave in proportions as desired in a given application. Thus, it is possible to incrementally delay the entire wave at each location leaving no part passing delay means 1 incrementally undelayed as it is equally possible of leaving the wave incrementally undelayed. It will be further appreciated by those skilled in the art that while delay means 1 is shown in FIG. 2 by way of example as a device internal to lens or antenna 2 it may equally well be implemented as a device external to lens or antenna 2, this all being possible in accordance with the state of the art and the frequency at which delay means 1 operates. Also, it will be further appreciated that while the beamsplitter-recombiner of delay means 1 is shown in FIG. 2 by way of example as a spatial beamsplitter it may be implemented equally well as a Michelson type beamsplitter, Michelson type interferometer, Nicol, Rochon, and Wollaston prisms, and transmitting and reflecting interference materials and coatings or in any one of a number of ways equally providing the results of beamsplitter 11a, recombiner 11b, and mirrors 11c. Also, delay unit 11 may comprise any one of a number of materials, interferometers, phase shifters, delay lines, modulators for achieving the desired results, i.e., for implementing delay means 1 as a spatial matched filter. Moreover, it is possible to vary one of the amplitude frequency and phase of a wave passing through delay means 1. Delay unit 11, shown in FIG. 2, is for decreasingly delaying signals as a function of the signal path between target 7 and detector 4. It will be appreciated by those skilled in the art that the delay function of delay unit 11 (FIGS. 1 and 2) can be accomplished in a number of ways, for example using geometry, materials, modulators, or combinations of same for slowing down or delaying first appearing signals until these coincide in time with later appearing signals from target 7. Thus, delay unit 11 may comprise an air or physical path (through a material) such as may be provided by a grating, lens, delay line, or modulator.

The signals in the wavefront which appears across the face of delay means 1, in time sequence, as target 7 crosses beam 3 in the direction x follow paths 9, 8, 10 in the sequence given. The signals in paths 9, 8, 10 are shown traced through delay means 1 and lens or antenna 2 and eventually falling on detector 4. The signals in paths 9, 8, 10 are characterized as each having the same coherent frequency when the target itself is a coherent source or each having the same spectral distribution when the target itself is a non-coherent source. The particular signal in path 8 remains unchanged in its coherent frequency or spectral distribution as target 7 crosses line 8. All other signals are shifted according to the doppler law. Shown in FIGS. 1 and 2 are the frequencies $f_1$, $f_o$, $f_2$ which correspond to the three paths 9, 8, 10, respectively. The result is that a chirp signal having a bandwidth of doppler frequencies B and time duration T appears as a spatial unsynchronized wavefront at the input of delay means 1 as target 7 crosses beam 3. Thus, the signals, whether these be coherent or not, which appear as input to delay means 1 all have carrier $f_o$ excepting that they are shifted in doppler according to their displacement away from the particular path 8. The signals are also time displaced, i.e., signals arrive at delay means 1 asynchronously. Delay means 1 synchronizes or focuses signals so that they will appear at the same time at its output. For example, optical paths 8, 9, 10 between target 7 and detector 4 are equal but physical path 9 is longer than physical path 8, which, in turn, is longer than physical path 10 by virtue of the later transit of target 7. In certain applications, delay means 1 can provide the cosine modulation of signals. Prior to its detection, the frequency spectrum in a given path may be changed to a mean frequency for that path in a frequency synchronizer which may be used optionally only when the signal in a given path is broadband. The frequency synchronizer (not shown) is not to be confused with delay means 1 which acts as a time synchronizer and is not essential to the basic operation of the invention but serves the purpose of increasing the amount of signal energy available and to modify the spectral distribution of the input to detector 4. Any of the well known frequency synchronizers multilayer thin film coatings, frequency shifters, heterodynes, etc., which can provide the desired compacting of frequencies to a mean frequency in a given path, may be utilized. Photomixing or photodetection of the synchronized wavefront emerging from delay means 1 occurs at the detector 4. Any of the well known detectors, such as imaging devices, single point detectors, one dimensional arrays, or multi-dimensional arrays of detectors may be utilized. The detected signal is fed to an output and display 5 which may include any one of a number of well known types. For example, any of the well known types of receivers such as direct or heterodyne types may be utilized. Any of the well known communications networks and computers for storage and computation of desired results may be utilized. Any of the well known types of displays, such as hardcopy recorders, photographic film, digital readout displays, or cathode ray tubes, may be utilized.

In many applications, a local or transmitting oscillator 6 may be added to the system to provide a stable reference, intermediate frequency (IF) operation as a local oscillator in a heterodyne receiver, to provide active transmissions through addition of a transmitter, or as one means for obtaining target range, range resolution, and two dimensional operation through addition of a transmitter. In particular the local or transmitting oscillator may include means for the amplitude, phase and frequency modulation of its output. Any of the well known types of local or transmitting oscillators may be utilized.

In many other applications the controller 12 is provided for controlling the delay unit 11 delay $t_2 - t$, and the beamsplitter-recombiner differential delay $\tau$. For example delay means 1 may be implemented having both delay units 11 and beamsplitter-recombiners in the microwave and optical systems of FIGS. 1 and 2. Thus, delay units 11 may be dispersive or non-dispersive surface acoustic wave delay devices for use at microwave frequencies and disperive or non-dispersive optoacoustic or material means delay devices for use at optical frequencies. And, delay units 11 may be tapped delay lines with taps controlled by controller 12 for varying the delay $t_2 - t$ at each location of delay means 1 as desired. And, delay means 1 may include two path beamsplitter-recombiners with the relative path lengths controlled by controller 12 for varying the differential delay $\tau$ as desired. Also, delay units 11 may include amplitude, frequency and phase modulators controlled by controller 12 for modulating signals as desired. In this manner, controller 12 controls the matched filter, and cosine modulation charateristics of delay means 1 as desired.

In the synthetic aperture system just described, target 7 being observed moves in the direction $x$ relative to lens or antenna 2 and with velocity $v$. The relative velocity $v$ is obtained through target 7 motion, lens or antenna 2 motion, or combinations of both motions. Pulses appear at the output 13 of detector 4 which correspond one-for-one with targets 7 or with elements of target 7 when target 7 is in the form of a label. Each such pulse is the result of integration of the synchronized spatial output of delay means 1 representing a single target 7 crossing the beam 3.

Figure 3:
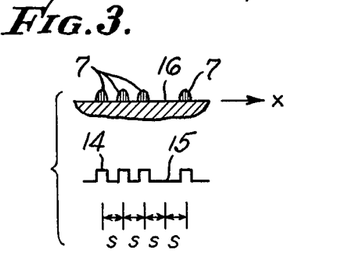
FIG. 3 is a time plot which illustrates the relationships existing between targets and pulses which appear at the output of the detector of FIGS. 1 and 2.

FIG. 3 illustrates the correspondence between closely spaced targets 7 crossing beam 3 and their corresponding output pulses at the output 13 of detector 4. A single pulse 14 appears at the output 13 for each target 7 as it completes crossing beam 3. No pulses 15 appear when targets 7 are missing from a given location 16. The pulses are separated by distance $s$ which is determined by the resolving power of the synthetic aperture. The height of the pulses at the output 13 is determined by the contrast of targets 7 when seen in the background or object 17 and by the bandwidth-duration product BT of the target produced signal. The width of pulses at the output 13 is determined by the resolving power of the synthetic aperture.

Figure 4A:
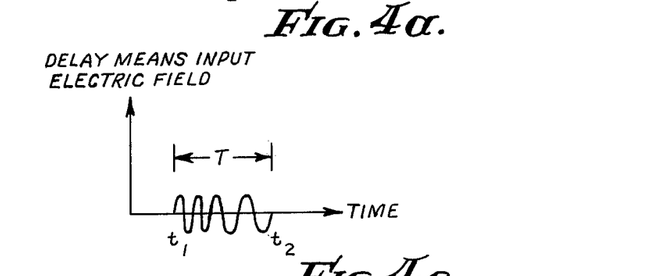
FIGS. 4a, 4b, and 4c illustrate by way of example the relationship of spatial input and output signals to delay means 1 of FIGS. 1 and 2.
Figure 4B:
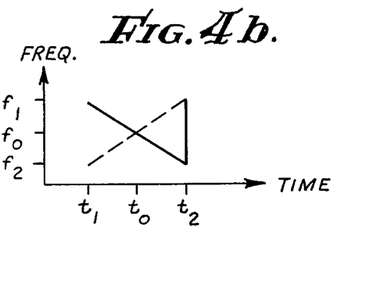

FIGS. 4a, 4b, and 4c show, by way of example, the relationships of spatial input and output signals to delay means 1. If target 7 crosses beam 3 at uniform speed $v$ in the direction $x$, the doppler modulation of the target signal, shown in FIG. 4a, decreases uniformly between frequency $f_1$ at time $t_1$ (when target 7 enters beam 3) to frequency $f_2$ at time $t_2$ (when target 7 leaves beam 3) so that $t_2 - t_1 = T$ is the signal duration, $t$ is the observation time, $f_2 - f_1 = B$ is the doppler or information bandwidth, and $f$ is the observation frequency. As shown in the sloping solid line of FIG. 4B, the spatial signal appearing at the input of delay means 1 from target 7 is therefore a linear downchirp. Thus, the target signal is asynchronous, i.e., each instant of the signal arrives at the input of delay means 1 at different times.

Figure 4C:
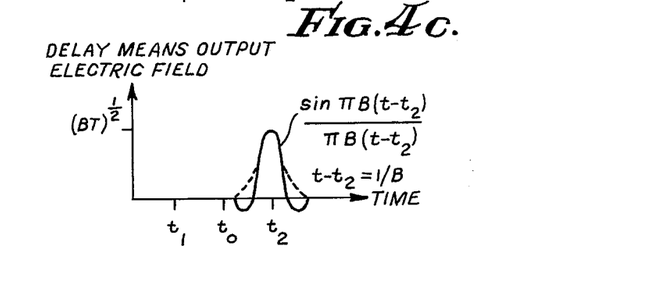

It is desired that delay means 1 synchronize or focus the target signal so that all spatial signal components leaving delay means 1 do so at the same time, as shown by the vertical solid line of FIG. 4b. To achieve this result, the delay means 1 must have the frequency-time characteristic shown by the sloping dashed line of FIG. 4b. The required synchronization, focusing, or processing of the spatial signal shown in FIG. 4a by delay means 1 can be viewed as a spatial weighted vector summation process or operation, a matched filter operation, or a correlation operation. For whichever viewpoint is chosen, a particular form of delay means 1 will result to process the target signal. The synchronized signal is shown as the solid curve of FIG. 4c which is shown as a sin$x/x$ pulse with $x = \pi B (t_2 - t)$ and having a pulse width of 1/B as measured at the half-powder points. It is a well known fact that this type of pulse can be produced when the target signal has the characteristic described by the sloping solid line in FIG. 4b and the processor has been implemented having the characteristic given by the sloping dashed line in FIG. 4b. While the prior art implements its processor as an electrical or optical matched filter after detecting the target signal of FIG. 4a, the present invention implements its processor in the form of delay means 1 acting as a spatial matched filter before the target signal of FIG. 4a is detected. The dashed line pulse illustrated in FIG. 4c represents the envelope of time sidelobes which result when the input pulse shown in FIG. 4a has been tapered, unintentionally by beam 3 or intentionally by delay means 1, as most likely the case will be in practice. These sidelobes are always significantly below those shown for the sin$x/x$ pulse solid line of FIG. 4c which corresponds to a flat pulse of FM shown by way of example in FIG. 4a.

It will be appreciated by those in the art that the relationships of input and corresponding matching characteristics of delay means 1, suggested by FIGS. 4a, 4b, and 4c are only approximate in practice. For example, the only delays of target signals considered by the sloping solid line of FIG. 4b are those due to target 7 crossing beam 3 at successive instants of time at uniform speed. In practice, additional time delays are present and these tend to produce a non-linear frequency-time characteristic. One example of an additional time delay is the differential time delay $\delta$ of the longer signal path 9 compared to the signal path 8. Also, a target 7 which crosses beam 3 at non-uniform speed produces a non-linear target signal characteristic. Moreover, the slope of the target signal characteristic will change with distance $q$. Thus, in practice, the actual target signal will have a characteristic most likely differing from the linear chirp signal shown by way of example as the sloped solid line of FIG. 4b. In any case, it will be appreciated that it is a straightforward task to accomodate such deviation from the linear example of FIGS. 4a, 4b, and 4c with similar results, i.e., for whichever the actual form of the target signal frequency-time characteristic (sloped solid line of FIG. 4b), the corresponding matched characteristic of delay means 1 (sloping dashed line of FIG. 4b) becomes known, the result always being the synchronized or focused characteristic of the output spectrum (vertical line of FIG. 4b). Thus, the delay $t_2 - t$ provided by delay means 1 (sloped dashed line of FIG. 4b) can assume any one of a constant, linear, non-linear or general function of time, the linear case shown by way of example in FIG. 4b.

If the lens or antenna 2 diameter is D, then the smallest angle between two targets or point sources 7 at the distance $q$ is given approximately by $$\theta = \lambda/D \qquad (1)$$

where d diameter of lens or antenna 2, and
$\lambda$ wavelength.

The angle $\theta$ forms beam 3 and subtends the distance L at distance $q$. Equation (1) defines the theoretical limit of resolution in a lens limited by diffraction, when target 7 is stationary with respect to the lens. When target 7 crosses beam 3 a synthetic aperture becomes possible and the resolution which is possible far exceeds the limit prescribed by equation (1).

In the present invention, detector 4 is located at the image distance p which along with the target distance $q$ is reckoned from the lens or antenna 2. Detector 4 is physically mounted to receive the entire signal of target 7 crossing beam 3. Apart from its action as a spatial matched filter delay means 1 may also split the target signal into two parts separated by a differential time delay $\tau$ for each path 9, 8, 10 of the target signal. The Alford and Gold effect, as discussed in the paper by W. Alford and A. Gold, Am. J. Phys., vol 26, p. 481, 1958, is the cosine modulation of a broad spectrum electromagnetic signal. The cosine modulation is produced when the electromagnetic beam is divided in two parts and a path difference of $\tau$ seconds is obtained between the beams before they are combined in a quantum detector 4. The cosine modulation is a function of the time delay $\tau$ and is expressed by cos $(\omega\tau/2)$ where $\omega$ is a spectral frequency of the target or source 7 frequency spectrum. There have been several derivations of this effect, for example in the paper by M. Givens, J. Opt. Soc. Am., vol 51, p. 1030, 1961, and in the brief article by J. Bartling, "The Use of the Alford and Gold Effect as a Ranging Technique" appearing in the July, 1969 issue of Proc IEEE (Lett) p. 1335. A description of the Alford and Gold effect which includes the effect of target 7 crossing beam 3 in the direction $x$ gives the following frequency spectrum of the two recombined beams:

$$S_o(\omega + \omega_d) = \cos[(\omega + \omega_d)\tau/2] S(\omega + \omega_d) \qquad (2)$$

where $S_o(\omega_o + \omega_d)$
  recombined beam frequency spectrum appearing at the output of delay means 1 and corresponding to the vertical line in FIG. 4b, $S(\omega_o + \omega_d)$
  beam frequency spectrum appearing at the input of delay means 1 and corresponding to the sloped solid line in FIG. 4b, $\cos(\omega_o + \omega_d)\tau/2$
  cosine modulation, $\omega_o 2\pi f_o (f_o =$ spectrum center frequency), $\omega_d 2\pi f_d (f_d =$ doppler frequency), and $\tau$ differential time delay; equals the ratio $d/c$ where $d$ is the path difference between the two paths for a vacuum delay means 1 and $c$ is the velocity of light.

Figure 5A:
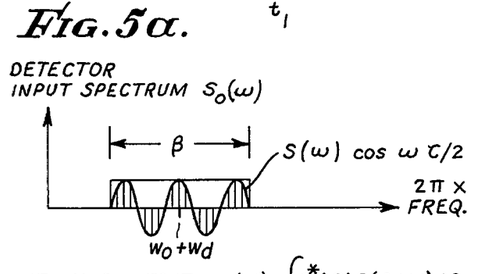
FIGS. 5a, 5b, and 5c illustrate by way of example the relationship of spatial input and electrical output signals to detector 4 of FIGS. 1 and 2.

Equation (2), shown in FIG. 5a, relates the fact that source 7 motion shifts the source and recombined beam spectra while the cosine modulation produced by delay means 1 amplitude modulates the source 7 frequency spectrum. The term source is used herein to denote the target 7 and particularly for a target 7 which emits a broad spectrum signal even when stationary (no doppler). FIG. 5a shows the recombined beam spectrum $S_o$ ($\omega$) at the output of delay means 1 and input to the detector 4 at a given instant of time, i.e., when target 7 is at a given location of its path. The broadband signal $S_o(\omega)$ of bandwidth $\beta$ comprises the target 7 frequency spectrum $S(\omega)$ cosine modulated by cos $\omega$ $(\tau/2)$. The recombined beam spectrum $S_o(\omega)$ will shift with doppler frequency as target 7 moves along path 17. Without delay units 11, the system is that of my U.S. Pat. No. 3,858,203, i.e., the detected signal is a chirp signal and can be processed in a post detection electrical or optical matched filter. With delay units 11, the detected signal is the impulse of the present invention; beam spectra $S_o(\omega)$ corresponding to the successive locations of target 7 arrive simulatneously at the detector 4, i.e., the signals have been synchronized or focused prior to their being detected in detector 4. It will be appreciated by those in the art that while the prior art always requires a transmitter and local oscillator 6 for preserving the phase relationships in a synthetic aperture by keeping received signals spectrally pure (coherent), this is not necessary for operation of the present invention which overcomes the problem of preserving the information phase relationships from either coherent or non-coherent moving sources by using the Alford and Gold effect, i.e., by the cosine modulation of broadband signals.

The doppler or information bandwidth of a signal from a target 7 crossing beam 3 is given by:

$$B = v \, vL/\lambda q = vL/cq f_o \qquad (3)$$

while the differential time delay $\tau$, provided by delay means 1 at any instant of time, is given by:

$$\tau \, d/c = d_o/c_o \qquad (4)$$

where
- $d$: physical path difference between delayed and undelayed beam in delay means 1,
- $d_o$: optical path difference between the delayed and undelayed beams in delay means 1,
- $c$: velocity of light in air, and
- $c_o$: velocity of light in the medium of delay means 1.

It will be appreciated by those in the art that the medium of delay means 1, defined as the medium of signal paths 9, 8, 10 inside delay means 1, may be other than air as desired. Thus, the physical path difference $d = c \, d_o/c_o$ can be implemented as a dielectric or diamagnetic means for delaying the propagation of electromagnetic or even acoustic waves.

Figure 5B:
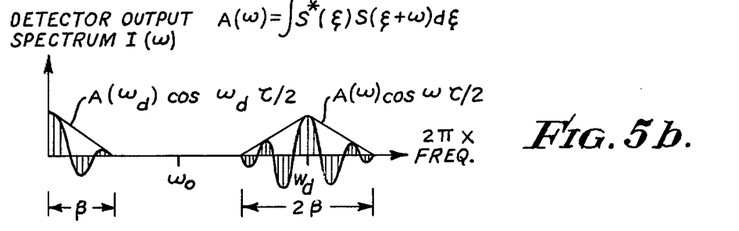

In a first approximation, the current $i(t)$ appearing at the output 13 of quantum detector 4 in a direct (non-heterodyne) detection system is, except for a constant given by:

$$i(t) = | \int H(\omega) \cos(\omega \tau/2) \, S(\omega) \, e^{j\omega t} \, d\omega |^2 \qquad (5)$$

where the function $H(\omega)$ is the transfer function, i.e., the dependence upon frequency of the sensitivity of quantum detector 4. To simplify the present discussion, the function $H(\omega)$ will be considered to equal unity at least over the information bandwidth B. Under this assumption, the output spectrum of quantum detector 4, shown in FIG. 5b, can be written simply, following the references by M. Givens, and J. Bartling, as:

$$I(\omega) = \cos(\omega \tau/2) A(\omega) \qquad (6)$$

where $$A(\omega) = \int S^*(\xi) \, S(\xi + \omega) \, d\xi \qquad (7)$$

is the frequency correlation of the input spectrum $S(\omega)$.

Figure 5C:
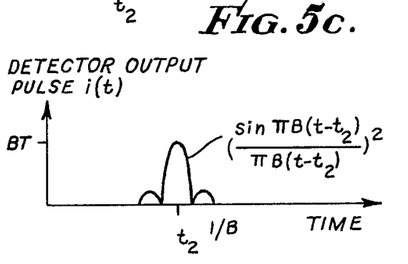

Finally, the output current $i(t)$, shown in FIG. 5c, is obtained by taking an inverse Fourier transform of equation (6) and, for the example of FIG. 5b, is the square of the synchronized signal shown previously in FIG. 4c, namely $$i(t) = \left( \frac{\sin \pi B(t_2 - t)}{\pi B(t_2 - t)} \right)^2 \qquad (8)$$

which contains only low frequency (dc or baseband) components and where presumably the high frequency components (appearing about frequency $2 \omega_o$) are too high to be passed by detector 4.

It will be appreciated by those in the art that quantum detector 4 of the present invention can be implemented either as a first detector in a direct detection system or as a first mixer in a heterodyne detection system, followed by an IF receiver and second detector. Thus, the present invention can be implemented either as a direct or heterodyne detection system and can be used with or without a transmitter 6, whether the target 7 reflects or radiates coherently or non-coherently, or as a narrowband or broadband source. In general, detector 4 is implemented as a linear or two dimensional array of detectors, each detector corresponding with a single target 7 crossing beam 3, with detectors arrayed in the x direction (or along signal path 8 in the z direction) to provide multispectral codings of target 7 and with detectors arrayed in the y direction (normal to the directions x and z) to provide crossrange capability, i.e., for detecting targets in two dimensions.

In summary, a monochromatic target 7 crossing beam 3 along path 17 will produce the pulse of FIG. 4c at the input to detector 4 by virtue of the synchronizing or focusing action of the delay unit 11 of delay means 1. And, the output of detector 4 will be detected as a pulse of width 1/B as monochromatic target 7 leaves beam 3. Significantly now, a braodband target 7 crossing beam 3 along path 17 will produce the pulse of FIG. 5c at the output of detector 4 as target 7 leaves beam 3. However, the pulse at time $t_2$ now has sidebands due to wideband target 7 as shown in FIG. 5b. In the absence of cosine modulation, $\tau = 0$ and the detector 4 output spectrum is given by the convolution $A(\omega)$ shown as the envelope of frequencies in FIG. 5b. With cosine modulation, the detector 4 output spectrum is given by the convolution $A(\omega) \cos \omega \tau/2$ as shown in FIG. 5b. Clearly the effect of the cosine modulation is to bring out a distinct peak in the detected broadband spectrum and it is this peak which is used to implement the synthetic aperture of the invention and that of my U.S. Pat. No. 3,858,203; the difference being the predetection matched filtering of the former and postdetection matched filtering of the latter. Thus, one important use of the cosine modulation technique is for peaking the detected spectra of broadband signals and thereby enabling the processing of such signals in the like manner of monochromatic signals, for example to generate a synthetic aperture. Another important use of the cosine modulation technique is for amplitude modulating frequency modulated signals prior to their detection, for example the system of my U.S. Pat. No. 3,858,203. And, the cosine modulation technique can be implemented postdetection rathre than predetection as suggested up to this point.

It can be readily seen that the system of the present invention generates a synthetic aperture in a manner which is analogous to that employed by the prior art. The differences being: while the prior art implements a post detection matched filter in real or delayed time, the present invention implements a predetection spatial matched filter in real time. However, unlike the prior art, the synthetic aperture of the present invention may be generated passively and/or whether or not the targets themselves are coherent or not, and especially when the target is a broad spectrum non-coherent source.

Physically, the time delay $t_2 - t$ of delay means 1 is required to vary spatially in each signal path 9, 8, 10 to provide the matched filter characteristic (sloped dashed line of FIG. 4b) for a target 7 crossing beam 3. The spatial variation of the time delay $t_2 - t$ can be obtained by varying any one or more of the parameters in delay means 1, i.e., by implementing delay means 1 as any one of a reciprocal, non-reciprocal, analog, or digital phase shifter, ferrite or diode, bulk or acoustic surface wave delay line 11 embedded in a dielectric material or radome. Referring to FIG. 2, a simple mechanical implementation of delay means 1 can be obtained by tilting mirrors 11c so that the signal path lengths 9, 8, 10 become adjusted to provide the required delay $t_2 - t$ between the two beams. Moreover, the matched filter characteristic of delay means 1 can be changed by any one of a number of means electrically, magnetically, acoustically, or mechanically.

The basic operation of the present invention has been illustrated thus far in one dimension — the dimension x. The additional capability of the invention to operate in two dimensions will now be further illustrated.

Several conventional two-dimensional scanning techniques are described in the paper by J. Horan, "Spacecraft Infra-Red Imaging" appearing in the July, 1968 issue of IEEE Spectrum. Although applicable to the present invention, such techniques limit the potential system resolution in the direction y because of lens or antenna 2 diffraction in the y-direction. Preferred techniques for obtaining two-dimensional images, which are not limited by lens diffraction in the crossrange direction y, are described in the reference by L. Cutrona, et al., and in W. Brown and L. Porcello. Such techniques utilize short pulses, i.e., the pulse modulation of transmitter 6 to discriminate targets in the crossrange direction y. Using this technique of conventional synthetic aperture for obtaining two-dimensional images therefore results in the fullest potential for the system of the present invention. Other preferable means, however, for obtaining two-dimensional images are feasible and these will now be discussed.

It is an easy matter to see that the detector 4, when implemented as an array of detectors in two-dimensions, will provide a number of parallel diffraction channels in the direction y, each channel corresponding to a single detector in the planar array. It will be recognized that beam 3 shown in FIGS. 1 and 2 by way of example is but a single diffraction limited component of a group of similar beams leading to a detector in the planar array of detectors, the totality of which constitute the lens or antenna 2 field of view. Each such channel operates in the manner disclosed thus far. Thus, a synthetic aperture is generated by each channel in the direction x but no corresponding synthetic aperture is generated in the direction y normal to x. The synthetic aperture therefore determines the resolution of objects in the direction x in accordance with the technique of the present invention while the Rayleigh criterion whose approximation is given by equation (1) determines, in some embodiments of the invention, the resolution of targets in the direction y. It will be appreciated by those in the art that shaping of beam 3 both in the directions x and y can be utilized to offset the differential resolving capabilities in the two directions.

Shaping however is but one way to equalize the system resolving capability in two dimensions and has every disadvantage of an arrayed detector system, namely a large lens or antenna 2 is needed to accomodate the array of detectors. Another technique for accomplishing two-dimensional operation of the present invention, mentioned previously in terms of pulsing, has to do with the implementation of the system using a transmitting oscillator 6 with AM or FM modulation for resolving the crossrange direction y. The use of an active system may be considered therefore in applications where either or both the range and the two-dimensional resolution of targets must be obtained. However, active operation has the disadvantages of being a radiation hazard in some applications and having its presence advertized by its transmission in others. Yet another technique for accomplishing the two-dimensional operation of the present invention is the scanning method disclosed in my U.S. Pat. No. 3,790,939 for providing a most efficient means for accomplishing this task without transmission. To the extent to which the system is implemented to operate in two dimensions it can serve in applications such as real time surveillance, reconnaisance, and ground mapping of targets to aircraft and satellites, the reading of pages in a book, and the automatic recognition of patterns and letters by small and efficient scanners, data sensors and character readers. To the extent that the system is implemented to operate in one dimension it can serve in applications for the identification of objects using labels, and/or speed measurement; object identifiers are obtained by implementing target 7 as a label device, for example having a subgroup of target elements 7 as shown in FIG. 3, with target elements 7 arranged in a suitable code which can be read by the synthetic aperture operating as a code reader; object speed measurement is obtained by measuring the width 1/B of the pulse appearing at output 13 of detector 4, the bandwidth B being a function of the speed v as shown by equation (3).

The peak of the current pulse appearing at the output 13 of detector 4 is improved by a factor B T over the signal current level of the same target detected by a non-synthetic aperture. The signal width of the pulse at the output 13 is 1/B and this is much smaller than the signal duration T of target 7 crossing beam 3 or diffraction limited non-synthetic aperture. The resolution s between two targets 7 is given by $$s = (v/B) = (\lambda q)/L = \theta \lambda = D \tag{9}$$

which indicates the fact that the resolution s is proportional to the size of lens or antenna 2 along the path of relative motion, being independent of the wavelength $\lambda$ and distance q. In constrast, the conventional resolution of a diffraction limited lens or antenna is, using equation (1), proportions to the wavelength $\lambda$ and the distance q and is inversely proportional to the lens or antenna size D. Clearly, the resolution improvement factor over a diffraction limited lens or antenna is BT. As is well known by the prior art, the synthetic aperture will significantly exceed the performance of a diffraction limited lens or antenna both in its relative signal strength and ability to resolve targets. For example, the prior art resolution of bar codes in point-of-sales systems is about $5 \times 10^{-3}$ inches. Using the present invention, the resolution of bar codes can be easily made at $5 \times 10^{-4}$ inches or even $5 \times 10^{-5}$ inches as desired limited only by the wavelength available for use and the capability to manufacture a miniscule aperture 2a and lens 2b. Moreover, the improvement in the signal-to-noise ratio of several orders of magnitude in such systems can be easily obtained. It will be appreciated therefore that the system of the present invention provides smaller size, weight, power consumption and cost as well as increased performance for scanners, data sensors and character readers in such applications.

It will be appreciated by those skilled in the art that the downchirp signal of bandwidth B and time duration T (in FIG. 4b) may be due to a monochromatic, narrowband or broadband signal from target 7; that zero chirp i.e., slope of downchirp can be expected at optical frequencies for low crossing speeds v of beam 3 by target 7; that high chirp can be expected at microwave wavelengths for high crossing speeds v of beam 3 by target 7; that without delay means 1, a monochromatic signal is detected by detector 4 as a pulse of length T of rectified sine wave at the monochromatic frequency $f$; that conventional postdetection signal processing (electronic or optical) techniques fail to produce an integrated or compressed pulse (solid vertical line in FIG. 4b) unless the monochromatic signal is chirped; that predetection integration of the monochromatic signal can be obtained using delay means 1, in accordance with the system of the invention, to form a compressed pulse at the output of detector 4, for example delay means 1 in the form of a chirp coded grating as suggested in FIG. 4 in the reference by W. Kock; that cosine modulation of the monochromatic signal can be obtained using delay means 1, for example as suggested in my U.S. Pat. No. 3,858,203; that a cosine modulated monochromatic signal is detected by detector 4, as a pulse of length T of a rectified sine wave at the monochromatic frequency $f$ with cosine modulation of the signal pulse in time as desired; that conventional signal processing techniques (electronic or optical) can be used using the cosine modulation to obtain a compressed pulse; that predetection integration can be obtained using delay means 1, in accordance with the system of the invention, to form a compressed pulse at the output of detector 4, for example delay means 1 in the form of a chirp coded grating as suggested in FIG. 4 in the reference by W. Kock; that without dealy means 1, a narrowband signal of time duration T is detected by detector 4 as a pulse of length T of rectified sine waves of narrowband frequencies, i.e., a direct current (DC); that conventional postdetection signal processing techniques (electronic or optical) fail to produce a compressed pulse unless the narrowband signal is chirped; that predetection integration of the narrowband signal can be obtained using delay means 1, in accordance with the system of the invention, to form a compressed pulse at the output of detector 4, for example delay means 1 in the form of a chirp coded grating as suggested in FIG. 4 in the reference by W. Kock or by replacing the grating by a corrected half lens for passing all frequencies appearing in each path between target 7 and detector 4; that cosine modulation of the narrowband signal can be obtained using delay means 1, for example as suggested in my U.S. Pat. No. 3,858,203; that a cosine modulated narrowband signal is detected by detector 4 as a pulse of length T of rectified sine waves of narrowband frequencies with cosine modulation of the signal pulse in time; that conventional postdetection signal processing techniques (electronic or optical) can be used using the cosine modulation effect to obtain a compressed pulse; that predetection integration of the cosine modulated narrowband signal can be obtained for the cosine modulated narrowband signal using delay means 1, in accordance with the system of the invention, to form a compressed pulse at the output of detector 4, for example delay means 1 in the form of a chirp coded grating as suggested in FIG. 4 in the reference by W. Kock or by replacing the grating by a corrected half-lens for passing all frequencies appearing in each path between target 7 and detector 4; that without delay means 1, a broadband signal of time duration T is detected by detector 4 as a pulse of length T of rectified sine waves of broadband frequencies, i.e., DC; that conventional postdetection signal processing techniques (electronic or optical) fail to produce a compressed pulse whether the broadband signal is chirped or not; that predetection integration of the broadband signal can be obtained using delay means 1, in accordance with the system of the invention, to form a compressed pulse at the output of detector 4, for example by replacing the grating in the reference by W. Kock by a corrected half lens for passing all frequencies appearing in each path between target 7 and detector 4; that cosine modulation of the broadband signal can be obtained using delay means 1, for example as suggested in my U.S. Pat. No. 3,858,203; that a cosine modulated broadband signal is detected by detector 4 as a pulse of length T of rectified sine waves of braodband frequencies with cosine modulation of the signal pulse in time; that conventional postdetection signal processing techniques (electronic or optical) can be used using the cosine modulated effect to produce a compressed pulse; that predetection integration of the cosine modulated broadband signal can be obtained using delay means 1, in accordance with the system of the invention, to form a compressed pulse at the output of detector 4, for example by replacing the grating in the reference by W. Kock by a corrected half-lens for passing all frequencies appearing in each path between target 7 and detector 4.

It will also be appreciated by those skilled in the art that the downchirp signal of bandwidth B and time duration T (in FIG. 4b) may be an impulse, short pulse, or long pulse signal; that impulses occur most likely at microwave frequencies for high crossing speeds $v$ of beam 3 by target 7; that short and long pulses occur most likely for low crossing speeds $v$ of beam 3 by target 7; that the impulse signal does not require the integration of signals to obtain pulse compression (conventional postdetection or predetection in accordance with the present system); that conventional postdetection signal processing techniques (electronic or optical) can be used using the cosine modulated effect to produce a compressed pulse; that predetection integration of short and long pulses can be obtained using delay means 1, in accordance with the system of the invention, to form a compressed pulse at the output of detector 4. Also, that while delay means 1 has been disclosed primarily in terms of a time synchronizer, i.e., for time synchronizing signals from target 7 crossing beam 3, each channel or path between target 7 and detector 4 may employ a frequency synchronizer in delay unit 11, i.e., for converting broadband signals in each path between target 7 and detector 4 to a mean frequency, for example as suggested in my U.S. Pat. No. 3,858,203. Also, that the matched filtering function is the primary function of delay means 1 and that the cosine modulation function is the secondary function of delay means 1 and, therefore, delay means 1 may be replaced by delay unit 11 in many applications, i.e., when the cosine modulation function is not needed. Finally, that the present invention is based on the suggestion of my U.S. Pat. No. 3,858,203 (col 1 lines 22-25) for a predetection integration of signals, i.e. for having delay means 1 for providing a spatial matched filter as well as for providing the cosine modulation.

It will be appreciated from the foregoing description of the apparatus and its operation that the invention provides an uncomplicated apparatus for a synthetic aperture that comprises delay means 1, a lens or antenna 2 forming beam 3, a detector 4, an output and display 5, and in some applications, a transmitter and/or local oscillator 6, and a controller 12. The delay means 1 acts as a matched spatial filter to synchronize or focus signals from a target 7 crossing beam 3 and thereby to provide a synchronized signal to detector 4 which detects the spatial signal as a shortduration electrical impulse. In some applications, delay means 1 also acts as a beamsplitter-recombiner to provide cosine modulation of the signal. In general, the system of the invention generates a synthetic aperture of monochromatic, narrowband, and broadband targets and capable of operating in real time and having small size, weight, power consumption and cost compared to the prior art, thus extending the range of application for such devices.

Turning now to a description of the method of the invention for generating a synethetic aperture. In general, the method of the invention comprises the steps of inputting a spatially unsynchronized signal from a crossing target 7 into a delay means 1 which delays signals which arrive asynchronously from targets and thereby providing a spatially synchronized signal at its output which can be detected by a detector as an impulse. More specifically, the method of the invention comprises the steps of: generating an electromagnetic receiving beam; receiving unsynchronized spatial signals from targets crossing said receiving beam; synchronizing said unsynchronized signals in a spatial matched filter prior to their being detected; and detecting said synchronized spatial signals as impulsive electrical signals.

The method of the invention can also be modified by including the step of cosine modulating signals in a delay device prior to their being detected.

The method of the invention can be modified by including the step of generating a transmitting beam for illuminating targets for reflecting signals to said receiving beam.

The method of the invention can be also modified by including the step of: generating a local oscillator signal for heterodyning signals in said detector.

The method of the invention can be also modified by including the step of controlling the frequency-time characteristic of said matched filter.

The method of the invention can be further modified by including the steps of: coding targets crossing said receiver beam; providing labels in the form of coded targets; attaching labels to objects for identifying objects with a code; and providing a plurality of labels with a label for each object.

From the foregoing it will be appreciated that, in addition to the uncomplicated apparatus, the invention also provides an uncomplicated method for providing a synthetic aperture. In general, the apparatus requires no wires or electrical connections for implementing delay means 1 as a matched filter, thus contrasting to the large requirement for same in the prior art systems. As a consequence, very small size, weight, power consumption and cost of apparatus is required to implement the present invention for a synthetic aperture over prior art systems having the same target sensing and resolving capabilities. Clearly, the microwave and optical embodiments of delay means 1 in FIGS. 1 and 2 require no external power except the minimal power which may be required by a controller 12 for adjusting their filter characteristics. For example, it has been found that the optical implementation of FIG. 2 for a simple bar code reader, including output and display 5 implemented as a decoder and digital display, weighed no more than 12 oz., whereas prior art synthetic aperture could not be considered for this task because of its large size, weight, power consumption and cost, primarily for implementing its post-detection matched filter. Also, the real time operation of the present invention contrasts to the off-line operation of a conventional synthetic aperture using optical post-detection matched filtering. In addition, the signal and data capacity of the present invention compare favorably to that for the conventional synthetic aperture using optical matched filtering. Yet the present invention produces these results at a small fraction of the size, weight, power consumption and cost, i.e., the present invention combines the best features of the prior art systems; the real time operation of systems using electrical matched filtering and the high data capacity of systems using optical matched filtering.

If the efficiency of a synthetic aperture is defined as the inverse product of its size, weight, power consumption and cost, the overall efficiency of the present invention over the prior art systems is over 1,000%. From this brief comparison of the improved efficiency of the invention over prior art apparatus and methods, it will be appreciated that the invention results in synthetic apertures that are suitable for use where prior art systems were unsuitable. For example, the high resolution which has been demonstrated by airborne synthetic aperture can now be used in satellites in reconnaisance, surveillance, and ground mapping. But more significantly, the present invention extends the use of synthetic aperture to the commercial sector in such applications as automatic vehicle identification using labels, industrial and materials identification systems using labels, postal mail and stock certificate bar code systems, point-of-sale systems, and in all applications where small size, weight, power consumption, cost and high resolution are required.

It will be appreciated by those skilled in the art and others that various modifications can be made within the scope of the invention. That is, other delay means 1 than those already disclosed can be used to spatially modulate the amplitude and phase of an unsynchronized electromagentic beam. And, a variety of well known output and display devices 5 can be used to carry out the invention. And, the invention can be operated at any one of an electromagnetic (radio, microwave, millimeter, infrared, optical, ultraviolet, etc.) or acoustic (low or high frequency sound) frequencies. Hence, the invention can be practiced otherwise than has been specifically described herein.

What is claimed is:

1. In a synthetic aperture having first means for forming a beam for receiving radiation from a target, a detector for a radiation beam from said first means, and an output and display for using and viewing detected signals from the detector, the improvement comprising:
a delay means inserted between the target and the detector, said delay means including a spatial matched filter for said radiation from said target moving through the field of view of said radiation beam.

2. A synthetic aperture as defined in claim 1 including a transmitter for directing radiation to said target in said receiving beam.

3. A synthetic aperture as defined in claim 1 including a local oscillator for heterodyning signals in said detector.

4. A synthetic aperture as defined in claim 1 including a beamsplitter-recombiner in combination with said delay means.

5. A synthetic aperture as defined in claim 4 wherein said beamsplitter-recombiner includes means for splitting incoming radiation from said target into at least two beams along different paths, and means for recombining the outgoing radiation into a single beam, with the paths of different length providing a differential time delay in one separated beam relative to the other.

6. A synthetic aperture as defined in claim 4 wherein said beamsplitter-recombiner includes a beamsplitter and beam combiner with said beamsplitter directing an incoming beam along a first and along a second path to at least one mirror for reflection to said recombiner for recombining to form an outgoing beam along the first path.

7. The system of claim 4 wherein the beamsplitter includes at least one mirror and means for directing an incoming beam along a first path and along a second path to at least one mirror for reflection to the recombiner for recombining to form an outgoing beam along the first path.

8. A synthetic aperture as defined in claim 1 wherein said delay means includes a delay unit which provides said spatial matched filter and a beamsplitter-recombiner means which provides a cosine modulation of a beam passing through said delay means.

9. A synthetic aperture as defined in claim 1 in a system for identifying objects with a coded label, wherein said target crossing said receiving beam is a label attached to an object, and with a plurality of labels with a label for each object.

10. A system as defined in claim 9 wherein said label is a harmonic means.

11. A system as defined in claim 9 wherein the code of said coded label is a binary code.

12. A system as defined in claim 9 with
each of said labels having a plurality of code element locations with code elements disposed at selected locations, with the presence and absence of code elements at code element locations comprising a code for the object, and with a code element comprising a zone having a radiation characteristic different from that of the background.

13. A system as defined in claim 12 wherein the spacing of code element locations of a label for a system operating at a particular wavelength and frequency is substantially proportional to the size of said lens or antenna along the path of relative motion of said synthetic aperture and label.

14. A system as defined in claim 12 wherein the spacing of code element locations of a label is substantially a linear dependence of the antenna size along the path of relative motion of said synthetic aperture and label and is substantially independent of wavelength and range.

15. A system as defined in claim 9 wherein said label is a non-harmonic means.

16. A system as defined in claim 9 wherein the code of said coded labels is a bar code.

17. A synthetic aperture as defined in claim 1 wherein said radiation from a target is an electromagnetic radiation.

18. A system as defined in claim 1 wherein said delay means is inserted in a location internal to said first means.

19. A system as defined in claim 1 wherein said delay means is inserted in a location external to said first means.

20. The system of claim 1 wherein said spatial matched filter is a non-dispersive delay line.

21. A synthetic aperture as defined in claim 1 wherein said radiation from a target is an acoustic radiation.

22. The system of claim 1 wherein said spatial matched filter is a dispersive delay line.

23. A method of generating a synthetic aperture, comprising the steps of:
generating an electromagnetic receiving beam;
receiving unsynchronized spatial signals from targets crossing said receiving beam;
synchronizing said unsynchronized signals in a spatial matched filter prior to their being detected; and
detecting said synchronized spatial signals as impulsive electrical currents.

24. A method as defined in claim 23 including the step of:
generating a transmitting beam for illuminating targets for reflecting signals to said receiving beam.

25. A method as defined in claim 23 including the step of:
generating a local oscillator signal for heterodyning signals in said detector.

26. A method as defined in claim 23 including the step of:
controlling the frequency-time characteristic of said matched filter.

27. A method as defined in claim 23 including the steps of:
providing labels in the form of coded targets; and
attaching labels to objects for identifying objects with a code.

28. A method as defined in claim 23 including the step of cosine modulating signals.

29. The method of claim 23 including the step of cosine modulating said unsynchronized signals prior to their being detected.

30. The method of claim 1 including the step of varying one of the frequency-time characteristics of said matched filter and differential time delay of said beamsplitter-recombiner.

* * * * *